US010684987B2

(12) United States Patent
Massarenti et al.

(10) Patent No.: US 10,684,987 B2
(45) Date of Patent: *Jun. 16, 2020

(54) IDENTIFICATION AND RECONCILIATION OF NETWORK RESOURCE INFORMATION

(71) Applicant: ServiceNow, Inc., Santa Clara, CA (US)

(72) Inventors: Davide Massarenti, Bothell, WA (US); Madhavi Puvvada, Sammamish, WA (US); Chinna Babu Polinati, Snoqualmie, WA (US); Manish Gupta, Redmond, WA (US); Purushottam Amradkar, Sammamish, WA (US); Hongbin Lin, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,281

(22) Filed: Jan. 3, 2019

(65) Prior Publication Data

US 2019/0213170 A1 Jul. 11, 2019

Related U.S. Application Data

(63) Continuation of application No. 15/497,020, filed on Apr. 25, 2017, now Pat. No. 10,176,241.
(Continued)

(51) Int. Cl.
*G06F 16/14* (2019.01)
*G06F 16/27* (2019.01)
(Continued)

(52) U.S. Cl.
CPC ............ *G06F 16/14* (2019.01); *G06F 9/5061* (2013.01); *G06F 11/0727* (2013.01);
(Continued)

(58) Field of Classification Search
CPC .......... G06F 11/0727; G06F 17/30575; G06F 9/5061; G06F 15/16; H04L 41/0816; H04L 41/0856
See application file for complete search history.

(56) References Cited

U.S. PATENT DOCUMENTS 5,978,839 A 11/1999 Okuhara et al.
8,099,388 B2 1/2012 Shen et al.
(Continued)

OTHER PUBLICATIONS

BMC2012: Reconciliation Overview; Nov. 2012; (https://docs.bmc.com/docs/display/public/ac81/Overview+of+reconciliation).
(Continued)

*Primary Examiner* — John M MacIlwinen
(74) *Attorney, Agent, or Firm* — Fletcher Yoder PC

(57) ABSTRACT

Systems and methods for the identification and reconciliation of network resource information are herein disclosed. In an implementation, a system includes instructions stored in memory for processing a request received from a data source to update a record of a network resource by receiving data relating to an attribute of a network resource of a computer network from a first data source, wherein the network resource is associated with a configuration item of a configuration management database, the configuration item including data relating to the attribute from a second source; determining that the first data source is authoritative for the attribute based on a priority of the first data source, a priority of the second data source, and a staleness period of the second data source; and processing the request by updating the attribute based on the data.

20 Claims, 8 Drawing Sheets

Related U.S. Application Data

(60) Provisional application No. 62/327,508, filed on Apr. 26, 2016.

(51) Int. Cl.
  *G06F 9/50* (2006.01)
  *G06F 11/07* (2006.01)
  *H04L 12/24* (2006.01)
  *G06F 15/16* (2006.01)

(52) U.S. Cl.
  CPC .......... *G06F 16/27* (2019.01); *H04L 41/0816* (2013.01); *H04L 41/0853* (2013.01); *H04L 41/0856* (2013.01); *G06F 15/16* (2013.01)

(56) References Cited

U.S. PATENT DOCUMENTS

| | | | |
|---|---|---|---|
| 8,433,771 B1 | 4/2013 | Ellsworth et al. |
| 8,645,543 B2 | 2/2014 | Tai et al. |
| 8,650,266 B2 | 2/2014 | Cohen |
| 9,325,790 B1 | 4/2016 | Le et al. |
| 2008/0141003 A1 | 6/2008 | Baker et al. |
| 2008/0163220 A1 | 7/2008 | Wang et al. |
| 2008/0201381 A1 | 8/2008 | Desai et al. |
| 2008/0235225 A1 | 9/2008 | Michele et al. |
| 2009/0319932 A1 | 12/2009 | Robinson et al. |
| 2010/0293420 A1 | 11/2010 | Kapil et al. |
| 2011/0153558 A1 | 6/2011 | Tubman et al. |
| 2011/0218982 A1 | 9/2011 | Otsuka et al. |
| 2011/0276572 A1 | 11/2011 | Wada et al. |
| 2012/0124211 A1 | 5/2012 | Kampas et al. |
| 2013/0318126 A1 | 11/2013 | Graefe et al. |
| 2013/0326531 A1 | 12/2013 | Kenkre et al. |
| 2014/0279385 A1 | 9/2014 | Sogorka et al. |
| 2015/0277967 A1 | 10/2015 | Calciu et al. |
| 2016/0078379 A1 | 3/2016 | Branch et al. |

OTHER PUBLICATIONS

BMC2013: Manual & Automatically Entry to CMDB conflict, Nov. 24, 2013; (https://communities.bmc.com/thread/95336?start=0&tstart=0).

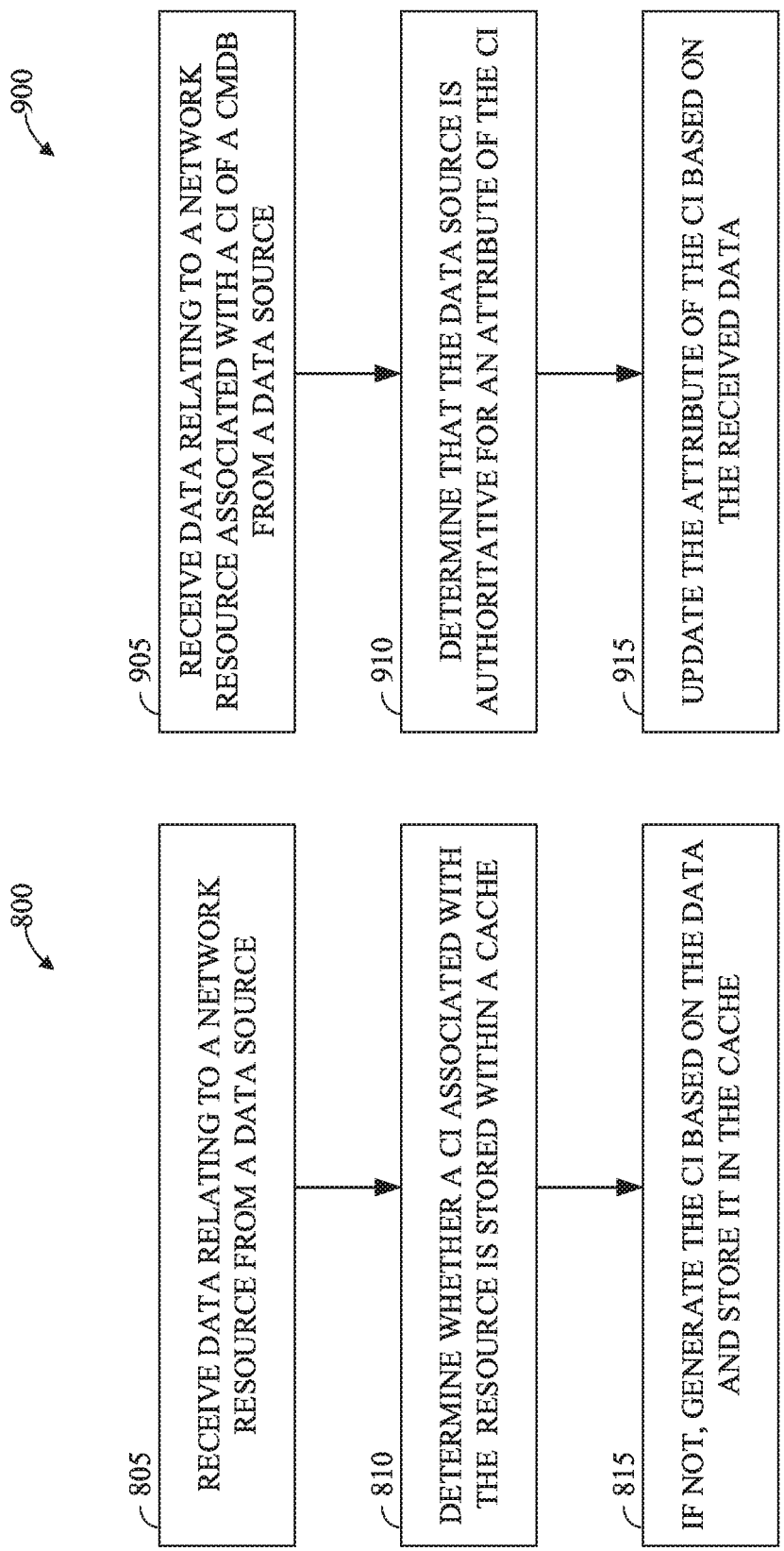

IDENTIFICATION AND RECONCILIATION OF NETWORK RESOURCE INFORMATION

CROSS-REFERENCE TO RELATED APPLICATION(S)

This application is a continuation of U.S. patent application Ser. No. 15/497,020 filed on Apr. 25, 2017, which claims priority to U.S. Provisional Patent Application No. 62/327,508, filed on Apr. 26, 2016, which is herein incorporated by reference in its entirety.

TECHNICAL FIELD

The present disclosure relates in general to techniques and devices for the identification and reconciliation of network resource information.

BACKGROUND

Network discovery can include collecting data about devices that exist on a network. Each device may require a large amount of data to fully describe the device, and discovery of certain information may be necessary before discovering further information, making a multi-stage discovery process desirable. Information related to the network, devices within the network, and relationships between the devices may be stored in a configuration management database (CMDB), and records containing data for the devices, software, and relationships are defined herein to be configuration items (CIs).

SUMMARY

Disclosed herein are implementations of systems and methods for identification and reconciliation of network resource information.

In an implementation, a system is provided for processing a request received from a data source to update a record of a network resource. The system includes a processor, a network interface, a memory, and a configuration management database comprising configuration items representative of network resources of a computer network, wherein the memory includes instructions executable by the processor to receive data relating to an attribute of a network resource of the computer network from a first data source in communication with the network interface, wherein the network resource is associated with a configuration item of the configuration management database, the configuration item including data relating to the attribute from a second source, determine that the first data source is authoritative for the attribute based on a priority of the first data source, a priority of the second data source, and a staleness period of the second data source, and process the request by updating the attribute based on the data.

In an implementation, a system is provided for processing a request received from a data source to update a record of a network resource. The system includes a processor, a network interface, a memory, and a configuration management database comprising configuration items representative of network resources of a computer network, wherein the memory includes instructions executable by the processor to receive, from a data source in communication with the network interface, a first update request comprising data to commit to a configuration item of the configuration management database, identify a graph of configuration items of the configuration management database associated with the first update request, wherein the graph includes an independent configuration item, lock the independent configuration item, wherein the locking prevents a second update request from being processed with respect to one or more configuration items of the graph, and, on a condition that a state of the independent configuration item has not changed within a time interval between the identification of the graph and the locking of the independent configuration item, commit the data to a configuration item of the graph.

These and other implementations of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

FIG. 8 is a flowchart of an implementation of a method for the identification of network resources.

FIG. 9 is a flowchart of an implementation of a method for the reconciliation of network resources.

DETAILED DESCRIPTION

Figure 1:
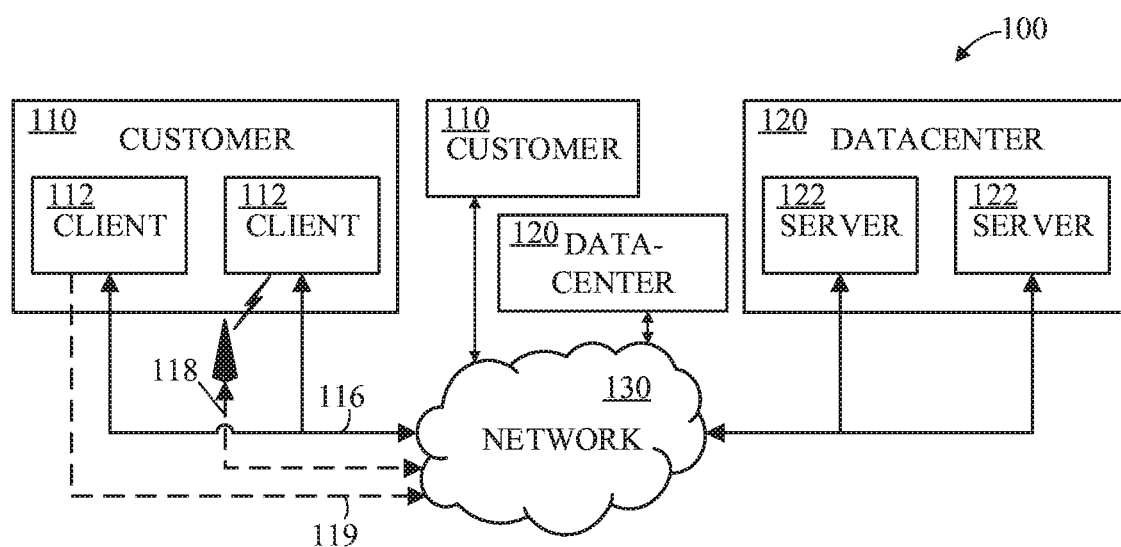
FIG. 1 is a block diagram of a distributed or cloud computing system.

Data indicative of network resources can be identified before being populated within a database, such as a CMDB (e.g., by generating or updating CI records). For example, in order to prevent redundancy or reduce inconsistencies, it may be desirable to not include duplicate CI records within a CMDB. The ability to uniquely identify CIs during a discovery process can be used to avoid entry of duplicate records. However, it may not be possible to uniquely identify a CI based on a single, pre-defined attribute value. Further, it may be desirable to monitor the data sources from which update requests are received with respect to CI records. For example, information about a particular CI attribute might be received from multiple sources, one of which is more reliable than the others. Without a system for determining which of the received data is authoritative for the CI attribute, information stored in a CI record might be updated with information from a less reliable source. Thus, in an implementation, sources of data for a CI attribute can be ranked such that data received from a more highly ranked source can be deemed authoritative as compared to data received from a lower ranked source. In an implementation, information in a CI record deemed authoritative as compared to later received data will not be updated (e.g., where the later received data is from a lower ranked source).

However, in the event an authoritative data source is no longer used or available to update the CI record, for example, because the data source has been taken offline, the CI record may undesirably not be updated even if the underlying attribute actually changes.

Implementations of the present disclosure describe systems and methods for the identification and reconciliation of network resource information to and against CI records. In an implementation, identification rules can be used to determine whether a record for a resource is stored within a data source of a computer network, for example, in order to prevent data duplication. The data source can be a cache managed by a least-recently-used policy for storing data indicative of CI records within a CMDB, for example, to preclude manual evaluation of identification operations. In an implementation, reconciliation rules can be used to determine whether a data source from which a request to update a resource of the computer network (e.g., a CI record, or an attribute of a CI record, within a CMDB) is authoritative for the resource based on a priority as against other data sources and a period of time since the last request to update the resource was received from the data source.

In an implementation, resources can refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources can also refer to computing features such as documents, models, plans, sockets, virtual machines, etc. In an implementation, resources can refer to physical and/or virtual implementations of the foregoing, as applicable. The present disclosure may occasionally make specific reference, for example, to "infrastructure resources" or "applicative resources" for certain uses of resources; however, where the disclosure merely references "resources," it may refer to any of the foregoing types of resources, unless the context specifically indicates otherwise.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer, a virtual machine and the like. The datacenter 120 and servers 122 are examples only, and a cloud computing system may have a different number of datacenters and servers or may have a different configuration of datacenters and servers. For example, there may be tens of datacenters and each datacenter may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
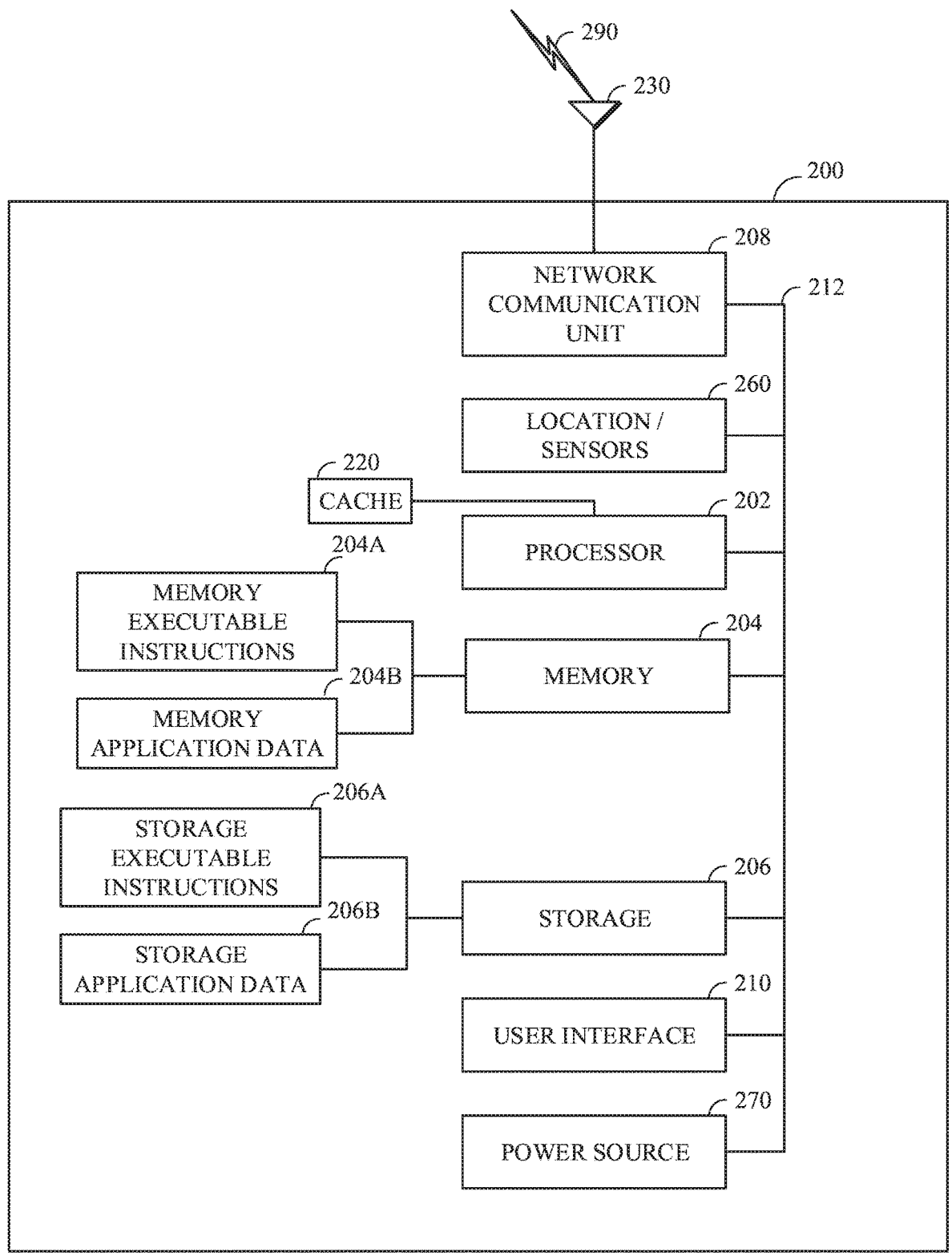
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server device 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
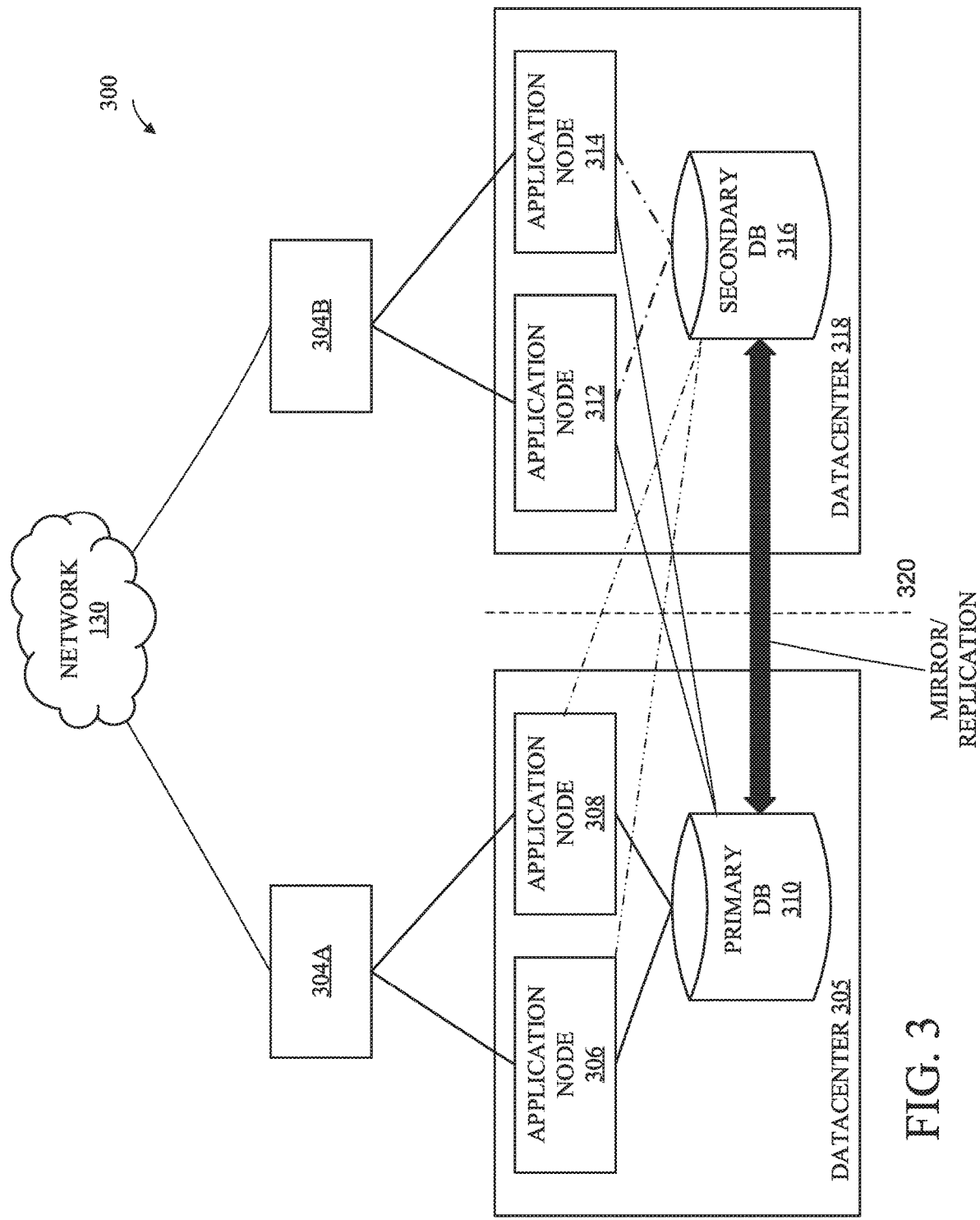
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A-304B and two datacenters 305, 318. The load balancers 304A-304B are coupled to a telecommunications network graphically depicted by network 130. Load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between datacenters 305 and 318. Depending upon the intended application, the databases 310, 316 may be implemented using, for example, a relational database management system (RDBMS), an object database, an XML database, flat files, or the like. In an implementation, datacenters 305, 318 include web servers (e.g., Apache installations) implemented on physical hardware servers (e.g., servers 122 of datacenter 120 of FIG. 1) for processing client requests to access resources of a customer computer network.

Each datacenter can include two application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with the databases 310 and 316 filling this role. In an implementation, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines. In an implementation, primary database 310 and/or secondary database 316 can be a database server catalog, for example, a MySQL catalog.

As mentioned above, each datacenter 305, 318 may have its own load balancer 304A-304B. Each load balancer may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The components 304A-304B also coordinate requests from remote clients to the datacenters 305, 318, simplifying client access by masking the internal configuration of the datacenters. The components 304A-304B may serve these functions by directing clients to processing nodes as configured directly or via DNS. Load balancer 304A-304B can be configured for sticky sessions. With sticky sessions, requests from a client can be forwarded to the same application node 306, 308 for the duration of the client session.

In regard to load balancing, the components 304A-304B can be configured to direct traffic to the secondary datacenter in the event the primary datacenter 305 experiences one of many enumerated conditions predefined as failure. The load balancing functionality of the components 304A-304B can be provided as separate components or as a single component.

The distributed computing system 300 can allocate resources of a computer network using a multi-tenant or single-tenant architecture. Under a multi-tenant architecture, installations or instantiations of application, database, and/or other software application servers may be shared amongst multiple customers. For example, a web server (e.g., a unitary Apache installation), application server (e.g., unitary Java Virtual Machine) and/or a single database server catalog (e.g., a unitary My SQL catalog) may handle requests from multiple customers. In an implementation of this architecture, the application and/or database server software can distinguish between and segregate data and other information of the various customers using the system.

In a single-tenant infrastructure, separate web servers, application servers, and/or database servers can be provisioned for each customer instance. In an implementation, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an implementation, a customer instance comprises multiple web server instances, multiple application server instances, and multiple database server instances. The server instances may be located on different physical servers and share resources of the different physical servers with a number of other server instances associated with other customer instances. In a given cloud computing system, different implementations of customer instances may be used for different customer instances at the same time. Other configurations and implementations of customer instances may also be used. For example, in an implementation, web server and application server functionality are treated as a single unit (of which there may be multiple units present), each unit being installed on respective physical servers.

Figure 4:
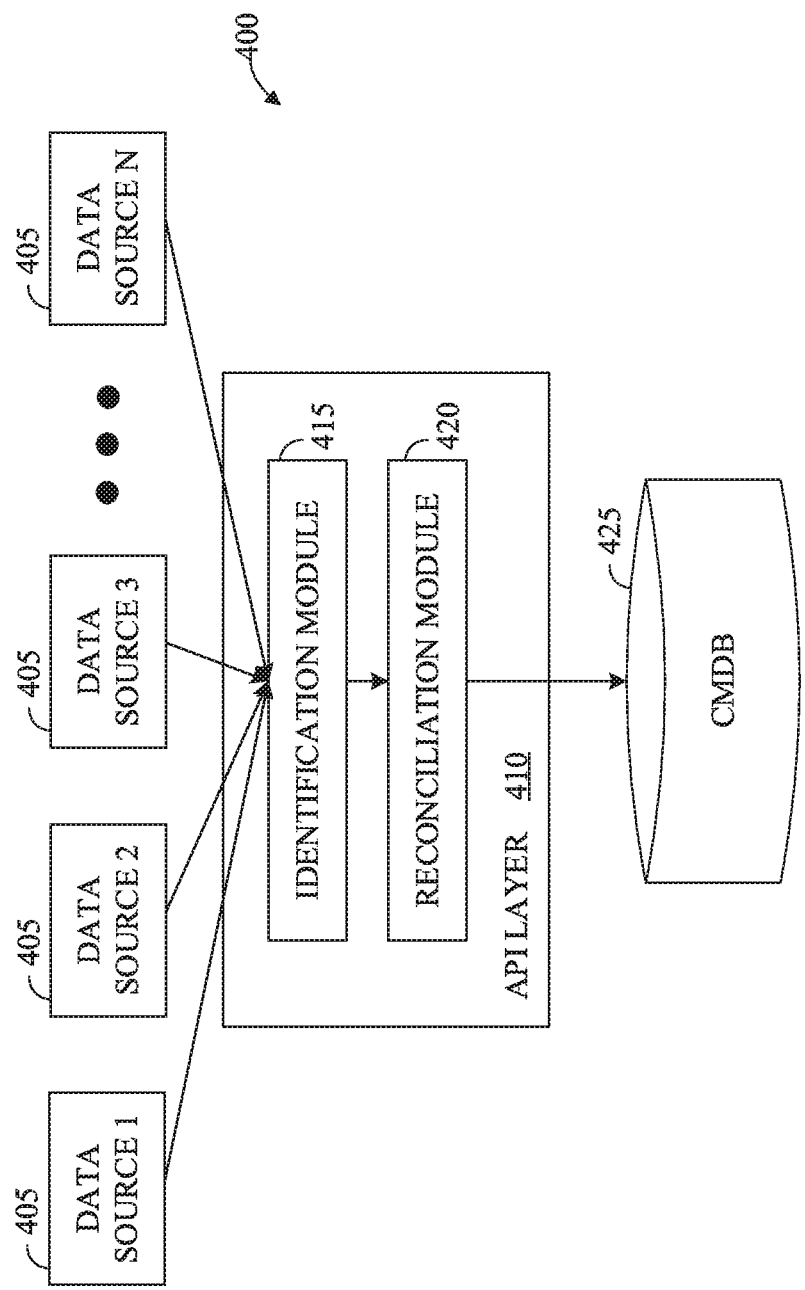
FIG. 4 is a diagram of an implementation of a system for identification and reconciliation of network resource information.

Certain operational aspects of the disclosure will now be described with reference to FIGS. 4 through 7. FIG. 4 is a diagram of a system 400 used in an implementation for processing data indicative of network resources within a computer network. The processing, which includes the identification and reconciliation of network resources, may be performed by servers executing a cloud computing instance (e.g., implemented via application nodes and databases, such as application nodes 306, 308 and database 310 of FIG. 3) including a database (e.g., a CMDB) populated with records of network resources (e.g., CIs) of the computer network. In an implementation, identification and reconciliation functionality may be supported by identification rules, reconciliation rules, de-duplication tasks, or the like. Generally, and in an implementation, identification can refer to the process of uniquely identifying CIs to determine if the CI already exists in the CMDB or if it is a newly discovered CI that must be added to the CMDB, and reconciliation can refer to the process of reconciling CIs and CI attributes by allowing designated authoritative data sources to write to the CMDB at the CI table and attribute level. In an implementation, the CMDB may be updated in real time as records are being processed (e.g., using insert and update operations performed against the CMDB). In an implementation, the need for a staging area external to the CMDB (and a secondary database or data warehouse) for identification and reconciliation operations can be removed through use of, for example, identification rules usable in association with a cache for storing frequently used records of the CMDB and reconciliation rules for indicating authoritativeness of data sources. In an implementation, optimistic locking can be used to permit multiple data sources to concurrently update different CIs. Implementations for using concurrency control, such as optimistic locking, to update CIs are discussed below with respect to FIG. 7.

In an implementation, data used for populating CIs within the CMDB can be received from data sources 405 during, for example, a discovery process. In an implementation, a data source 405 can communicate data indicative of a condition (e.g., network presence, connection relationships within the network, resource status or attributes, inclusion within a deployed service environment, etc.) of network resources of the computer network. In an implementation, the condition communicated by a data source 405 can be a physical condition of a network resource relating to the operation of network resource. For example, the physical condition can be a temperature of a CPU of a server computer, an installation status of an application on a hardware device, a loss of network connection through routers, switches, or other network devices, etc. In an implementation, any number of data sources 405 can be in communication with an API layer 410 for processing the data received from the data sources 405, for example, before the data enters CMDB 425. Data sources 405 can include, for example, machines (e.g., applicative resources or infrastructure resources operating on applicative resources) for communicating data, for example, data comprising comma separated values (CSVs), data generated in response to the performance of a horizontal discovery routine, data generated in response to the performance of a contextual discovery routine, data generated in response to the performance of a discovery process performed by or on a system outside of the computing network (e.g., third party systems), data manually entered as input to the computer network, or the like. In an implementation, a data source 405 can be registered with system 400 before requests to update data are received from it, or before update requests received from it can be processed by system 400.

In an implementation, API layer 410 interfaces data received from data sources 405 for processing by identification module 415 and reconciliation module 420 to determine whether and how the data is to be stored within CMDB 425. As such, in an implementation, an identification and reconciliation API, for example, implemented by API layer 410, may be utilized to enforce identification and reconciliation rules before data received from data sources 405 is stored in the CMDB. For example, discovery routines (e.g., instructions for performing horizontal or contextual discovery on resources of a computing network infrastructure) may call an identification API that, for example, applies business metadata rules for indicating relationships between CIs usable for identifying applicable CIs in CMDB 425.

In an implementation, identification module 415 can comprise instructions for identifying network resources, for example, by detecting whether a record for a network resource already exists within a computer network, and, if not, generating the record, for example, within CMDB 425. Implementations for the identification of network resource information, such as CIs, are discussed below with respect to FIG. 5. In an implementation, reconciliation module 420 can comprise instructions for reconciling network resources, for example, updating or generating a record for a network resource based on whether a data source (e.g., data source 405) from which data is received is authoritative for the resource. Implementations for the reconciliation of network resource information, such as CIs, are discussed below with respect to FIG. 6. Generally, and in an implementation, identification module 415 can be used to prevent improper or duplicate data from being stored within CMDB 425, and reconciliation module 420 can be used to prevent data within CMDB 425 from being updated by a data source that is not authoritative for the data.

In an implementation, if the instance encounters duplicate CIs in the identification and reconciliation process, it may not update or generate data for the CI. Instead, the instance may group sets of duplicate CIs into a de-duplication task for review. De-duplication tasks may be utilized to track the duplicate CIs until they can be resolved. De-duplication tasks may provide details about the duplication, including a list of all the duplicate CIs and the internal payload used during the identification process. A review of the details of each duplicate CI in the task and the data that was used to determine that the CI is a duplicate may be performed. If the duplicate CI is a dependent CI, then details of the dependent relationship and any relation qualifier chain may be viewed. If the dependent CI has a lookup table, then the details of the respective lookup table may be viewed.

Processing sets of duplicate CIs may depend on system properties and on the number of duplicate CIs in a set. In an implementation, if there are less than a configurable number of duplicate CIs in a set (e.g., five, by default), then the identification process may pick one of the duplicate CIs as a matching record, and update it. If there are more than five duplicate CIs in the set, then the identification process may report an error and not update or insert the CI. In either case, de-duplication tasks may be created.

In an implementation, CMDB 425 is a configuration management database comprising data (e.g., CIs) indicative of records of network resources of a computing network, such as computing system 100. In an implementation CMDB 425 may also comprise data indicative of the relationships between the network resource records. For example, the data can indicate dependencies between CIs of CMDB 425, which dependencies can be used to uniquely identify the CIs during an identification process, such as is discussed below with respect to FIG. 5.

Figure 5:
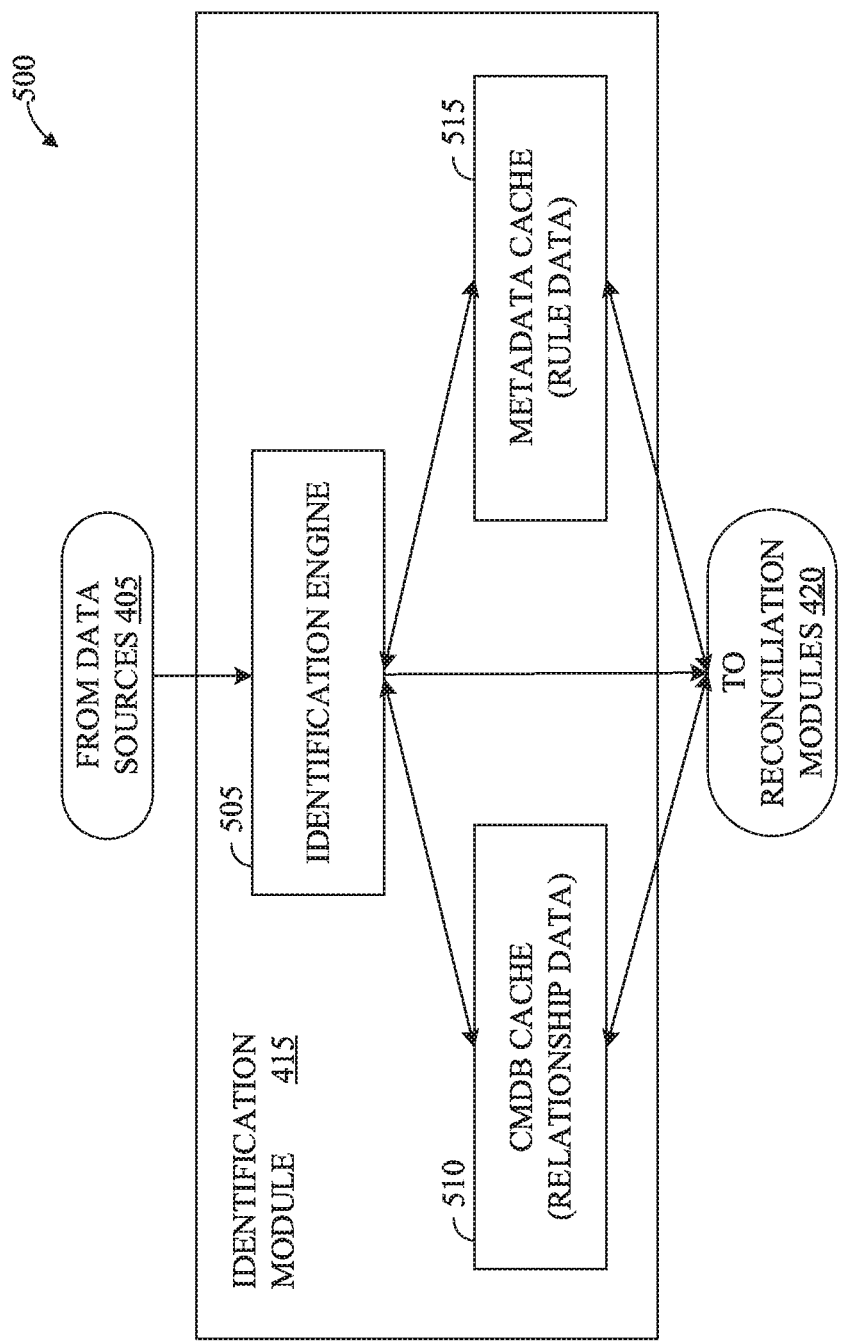
FIG. 5 is a block diagram of software components used in an implementation of network resource identification.

FIG. 5 is a block diagram 500 of software components used in an implementation of network resource identification. In an implementation, the components used for network resource identification are included in identification module 415 of FIG. 4. In an implementation, data indicative of a network resource, for example, a CI, can be received from data sources (e.g., data sources 405 of FIG. 4) and processed through an identification API, which can be used to enforce identification before the CI data is stored in the CMDB. The identification API can be used to preserve data integrity and prevent inconsistencies from being introduced to the CMDB, for example, by preventing the data sources from communicating data directly to the CMDB. In an implementation, the identification API is included as part of API layer 410 of FIG. 4.

CIs for some resources (e.g., hardware resources) can be identified based on the attribute values of the CI. For example, the MAC address and IP address of a server computer uniquely identify that hardware resource. In an implementation, CIs that can be identified based on their attribute values can be referred to as independent CIs. However, other types of CIs can be uniquely identified not just by their attribute values, but also by their relationship to other CIs in the CMDB. For example, to uniquely identify a software resource, such as an installed document processing software copy, the hardware resource that the software is installed on can be taken into consideration. As another example, an application server, such as a Tomcat, can be uniquely identified based on its installation directory and the hardware resource (e.g., server computer) on which it is hosted. In an implementation, CIs that can be identified based on their relationship to other CIs in the CMDB can be referred to as dependent CIs.

In an implementation, for example, where the data received from a data source (e.g., data source 405 of FIG. 4) is to be used for generating a new CI within a CMDB, it should first be determined whether the CI already exists in the CMDB. Because the various operations performed by the communications machines comprising the data sources (e.g., discovery processes) may access different aspects of a CI before presenting the data for processing, different combinations of attributes must be considered for determining the uniqueness of a CI. When a new CI is presented for processing (e.g., to have a record of the CI generated within the CMDB), a system performing the processing may run through a list of identification rules to determine whether the CI is already in the CMDB, for example, by comparing the presented CI's attributes to the combination of attributes considered by the various identification rules. For example, when presented with a new CI of a hardware type, the system may sequentially apply a set of rules corresponding to the hardware to the attributes of the CI and perform a database query using values indicative of the attributes against a table associated with each rule, such as a serial number, an IP address, a MAC address, a name for the hardware resource. In the event a matching CI is found in the database in response to the query, the presented CI can be determined to not be new, and so a record for the CI will not be generated within the CMDB; however, in the event no matching CI is found, the system can generate the CI within the CMDB.

Identification engine 505 can be a module or set of routines configured to uniquely identify various types of CIs, for example, using identification rules. In an implementation, an identification rule may comprise one or more identification entries that specify the attributes that uniquely identify the CI. These identification rules may apply to a CI class and comprise of one or more identifier entries that have a different priority. Each identifier entry may define a unique attribute set with a specific priority. Strong identification rules may be created that give the highest priority to the strongest identifier entries. In an implementation, each table in the CMDB can be associated with one or more identification rules.

The identification process and identification rules may utilize various attributes, such as unique attributes that are designated sets of criterion attribute values of a CI that can be used to uniquely identify the CI, and thus the corresponding network resource. Unique attributes can be from the same table or from derived tables. The steps for identifying dependent CIs can be different from the steps for identifying independent CIs. This may be reflected in the differences between identification rules for dependent CIs and identification rules for independent CIs.

In an implementation, an independent identification rule can be a rule for identifying an independent CI, for example, based on a MAC address and IP address of a hardware resource. In an implementation, an identification rule can also be configured to use a lookup-based identification approach. Lookup-based identification can reference attribute tables for a given CI that has a set of values for an attribute. For example, where a virtual server CI has a set of serial number attributes and a set of network adapter attributes, the identification of the CI can be done by looking up values in a serial number table and a network adapter table for the CI.

In an implementation, a dependent identification rule can be a rule for identifying a dependent CI by first identifying a CI related to the dependent CI. A CI can have dependency on one or more CIs. A dependent CI can have a dependency on a parent CI, which parent CI can have a dependency on another CI. The relationship types between a CI and its dependent CIs may also be used within the identification process. To assist in the identification process of dependent CIs, CMDB rules metadata may be added that define the dependency structure of CI types and the relationship types, in the context of a business service, for example. In an implementation, CMDB rules metadata can be stored within a metadata cache 515. In an implementation, metadata cache 515 can refresh whenever a change is made to an identification rule, for example, used by identification engine 505. In an implementation, the payload used for identification of a dependent CI (e.g., data received from a data source) can include a relationship with a qualifier chain. For such relationship, if there is a matching parent/child pair, the system may compare the qualifier chain in the payload with the qualifier chain of the CIs in the database. If there is a difference, the qualifier chain in the database may be updated to match the qualifier chain in the payload for that relationship.

In an implementation, a dependent CI can be identified in the context of another CI, which other CI typically hosts or otherwise contains the dependent CI. For example, a WAR file by itself is not unique, as there could be thousands of WAR files used within a given service. However, a WAR file that is hosted by or deployed to application server X can be unique compared to a WAR file hosted by or deployed to application server Y, since the uniqueness of each respective WAR file is dependent on the context by or in which it is hosted or deployed. In an implementation, data received from data sources can contain contextual information about dependencies for CIs.

The dependencies defined by the identification rules (e.g., used by identification engine 505 and stored as CMDB rules metadata within metadata cache 515) may be used when identifying dependent CIs. This information can help to define the order of CI identification and match CIs and respective dependent CIs in a payload. After defining a new CI type, metadata rules may be defined that specify how the new CI type is related to existing types in the CMDB. CMDB rules metadata may comprise hosting rules and containment rules that describe a relationship type between two CI types. Each set of rules can model the data from a different perspective of the CI. In an implementation, containment rules can represent CIs' configuration hierarchy, each containment rule describing which other CIs are contained by a given CI. For example, a containment rule can be used to show that a tomcat CI contains a WAR file CI. In an implementation, hosting rules can represent the placement of the CIs in a business definition, each hosting rule describing a resource on which a resource corresponding to the CI runs. For example, a hosting rule can be used to show that a software resource CI runs on a hardware resource CI. The same relationship type can be used in a hosting rule and in a containment rule. The context in which the relationship is used may be utilized to distinguish between a containment rule and a hosting rule, and plugins that have been activated on an instance may be utilized to determine which hosting and containment rules are available by default.

Hosting rules may be used to represent valid combinations for pairs of hosting and hosted CIs in the service definition. In an implementation, hosting rules may be a flat set of rules that can be one level deep, and may be created for resources, typically physical or virtual hardware. Each hosting rule may be a standalone rule between two CI types, and specify a relationship between a CI type and another valid CI type that it can host or be hosted on in the service definition. A hosting rule may comprise a parent CI type, a relationship type and a child CI type. For example, a hosting rule can specify that a particular application type runs on a particular hardware type. If a CI is hosted on multiple resources (such as Windows and Linux), a separate hosting rule may be created for the CI with each resource that it can be hosted on.

During CI identification, the pair of CIs in the relationship may generally satisfy at least one hosting rule. Hosting rules may be stored in the CMDB. A hosting rule may be used to describe what a network resource corresponding to a CI runs on. Hosting rules can help identify dependent CIs correctly during business discovery process. Discovery routines may call the identification API that applies business metadata rules.

The collection of containment rules may represent the containment hierarchy for a CI type. Each rule may specify the relationship between a CI type and another valid CI type that it can contain or be contained by in the service definition. The rules may be chained to each other in a containment rules group, with a CI type that is the top-level (root) parent of the group. Containment rules may be viewed as logical concepts and represent logical CIs, for example, to describe software that runs on a server. To designate that data flows into or from a CI type, an endpoint may be added to the rule for that CI type. Child rules should not be added after an endpoint. Containment rules may be stored in the CMDB. Containment rules may be used to describe which CIs are contained by a given CI. Containment rules can be used to help identify dependent CIs correctly during the business discovery process.

Given that the identification process is computationally- and data-intensive, one or more caches may be used for storing and maintaining data indicative of CIs, CI relationships, and/or identification rules, for example, in order to improve performance and reduce the number of database queries required for the identification process. In an implementation, CMDB cache 510 can be a least recently used (LRU) cache (e.g., managed by an LRU aging policy) for caching frequently used CIs and their associated relationships. In response to data being processed, for example, using an identification API, identification engine 505 can communicate with CMDB cache 510 to retrieve records of all CIs associated with the processed data. In an implementation, where a CI is not present within CMDB cache 510 at the time identification engine 505 communicates the retrieval request, CMDB cache 510 can evict data under its LRU policy (e.g., by deleting data indicative of CIs that have not been used by identification engine 505 or the CMDB for the longest period of time). In response to evicting the data, CMDB cache 510 can retrieve the requested CI data from the CMDB and refresh itself to include the data. In an implementation, where a relationship between CIs is changed (e.g., added, removed, or otherwise modified), CMDB cache 510 can refresh the data stored within it, for example, instead of deleting the data and adding new data in its place. For example, data indicative of the change can be broadcast throughout CMDB cache 510 (e.g., using instructions for rebuilding the CMDB based on the change), which may result in other changes to other CIs. States of the CIs stored in CMDB cache 510 can then be updated, as applicable, based on the resulting CI changes.

Other caches can be used in association with identification engine 505 for identifying CIs and their relationships. In an implementation, identification engine 505 can communicate with a metadata cache 515, which, as discussed above, can store data indicative of identification rules used for identifying CIs and their relationships. Metadata cache 515 can refresh in response to changes to any of the stored identification rule data being changed. Identification engine 505 can thus use both CMDB cache 510 and metadata cache 515 to uniquely identify CIs and determine if a given CI is unique or a duplicate in order to accordingly update the CMDB.

Figure 6:
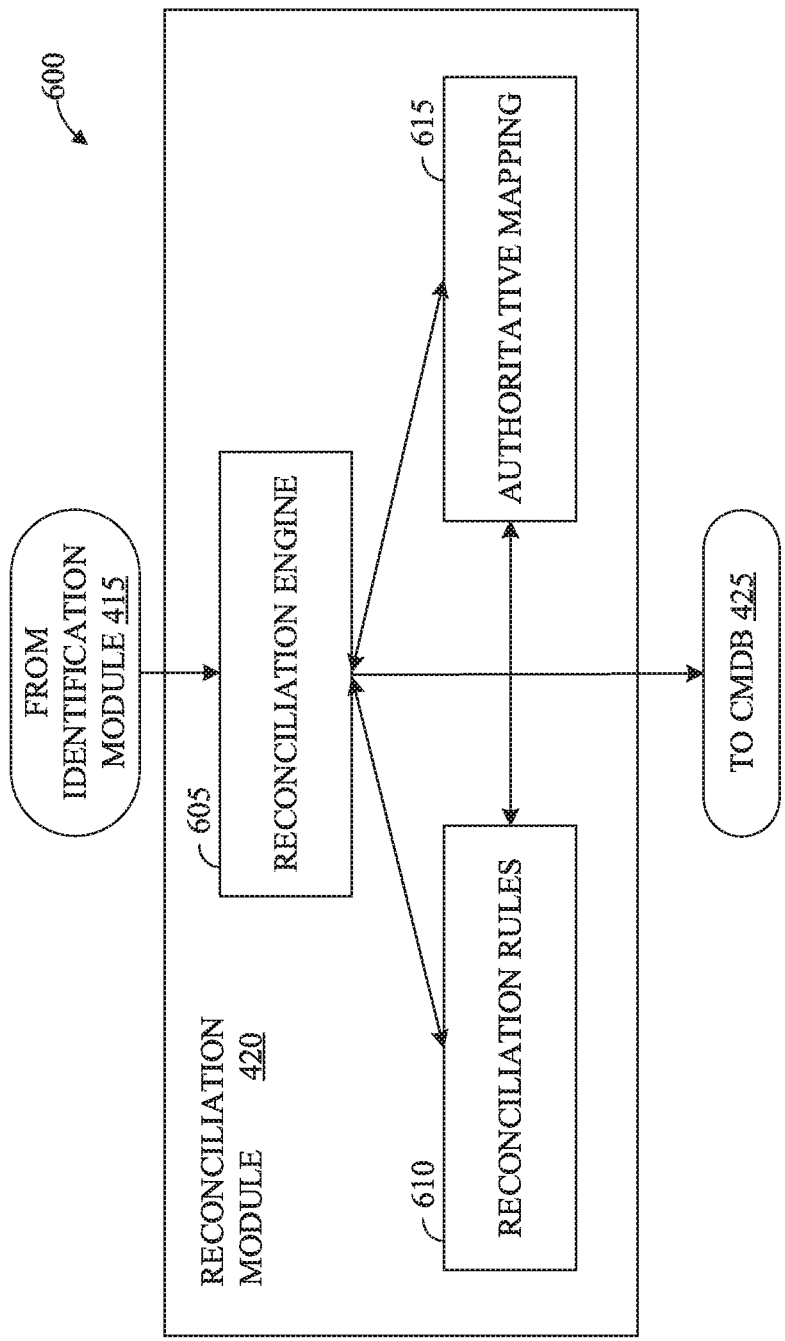
FIG. 6 is a block diagram of software components used in an implementation of network resource reconciliation.

In response to the performance of operations by identification module 415, the data being processed may be communicated to reconciliation module 420. FIG. 6 is a block diagram 600 of software components used in an implementation of network resource reconciliation. In an implementation, the components used for network resource reconciliation are included in reconciliation module 420 of FIG. 4. In an implementation, the data to be processed for reconciliation may be processed through a reconciliation API, which can be used to enforce reconciliation before the CI data is stored in the CMDB. The reconciliation API can be used to preserve data integrity within the CMDB, for example, by preventing the data sources from communicating data directly to the CMDB. In an implementation, the reconciliation API is included as part of API layer 410 of FIG. 4. In an implementation, the reconciliation API and the identification API discussed above with respect to FIG. 5 are included within a single API comprising API layer 410.

Reconciliation engine 605 can be a module or set of routines configured to process requests (e.g., received from a data source 405) for updating various types of CIs or CI attributes, for example, using reconciliation rules. In an implementation, a reconciliation rule can define the reliability (also referred to as priority or authoritativeness) of a data source relative to other data sources from which data can be used for updating a given CI or CI attribute. Notwithstanding the foregoing, it should be understood that the quality of a data source being authoritative does not necessarily mean that the data received from the data source is necessarily correct, accurate, trusted, dependable, reliable, or otherwise true. Rather, the quality of a data source being authoritative means that the data source is deemed to be more authoritative (reliable, or high priority) than other data sources for the purpose of updating data.

In an implementation, reconciliation rules 610 may specify which data sources can update a CI or a set of CI attributes, and they can be defined at the parent and the child level. A reconciliation rule may be provided for each data source that is authorized to update an attribute, and multiple reconciliation rules can exist for the same set of attributes. A reconciliation rule may specify the attributes that a data source is authorized to update for a given table and can prevent unauthorized data sources from overwriting the attributes' values. If multiple data sources are authorized to update the same CI or the same CI attributes in the CMDB, a priority can be assigned to each of the multiple data sources to prevent them from overwriting each other's updates. In this way, a data source with the greatest priority can be authoritative for the CI such that other data sources cannot update the CI. In an implementation, in the event a CI attribute does not have a value associated with it, any data source can be used to generate or update the attribute value. In an implementation, data indicating the mapping of authoritative data sources to CIs can be stored in an authoritative mapping data store 615. In an implementation, authoritative mapping data store 615 can be a table updated as reconciliation rules 610 change. In response to determining that a data source is authoritative for given data (e.g., because it has the highest priority for the data and therefore is the most authoritative for the data), reconciliation engine 605 can direct a request to update the data for processing in association with CMDB 425. In an implementation, processing the update request can comprise committing the data to a property of a CI to update the CI within a CMDB.

For example, a CI may have attributes A, B, C, D, and E, wherein a data source 1 may have priority 10 for attributes A, B, and C and a data source 2 may have priority 20 for attributes D and E, wherein priority 10 is higher than priority 20 and therefore more authoritative. In the event a system processing the data receives a request from data source 1 to update attribute A, the update is processed because data source 1 is the authoritative data source for attribute A. However, if a request is received from data source 2 to update attribute C, the system can determine that data source 2 is not the authoritative data source for attribute C and not process the update. Separately, if a request to update attribute E is received from a data source 3, the system can determine that there is not an authoritative data source for attribute E and process the update, which processing can include making data source 3 the authoritative data source for attribute E. Further, reconciliation rules 610 can be hierarchical. For example, in the system, a CI type "Linux Servers" can be defined as a hardware type of CI that is of type "Server." In the event a request to update a CI attribute for the Linux Server CI is received from a data source, but no data sources are authoritative for CI type Linux Server, then the request can be processed at a parent level of the hierarchy, for example, using data sources authoritative for CI type "Server."

However, in an implementation, the age of a data source's last update to a CI or CI attribute can also be used for determining whether that data source is authoritative for the CI or CI attribute. In an implementation, reconciliation rules 610 define not only the priority of a data source relative to other data sources for CIs or attributes of CIs, but also a period of time during which the data source remains authoritative, for example, by defining a limited period of time that a data source has highest priority over data. In an implementation, this defined period of time can be referred to as a staleness period. For example, if a data source has not updated any CIs or CI attributes for which it is authoritative within the staleness period (e.g., because the data source has been decommissioned, accidentally terminated, powered off, etc.), reconciliation engine 605 can defer authoritative priority to a different data source. In this way, reconciliation engine 605 can preclude a stale data source from remaining authoritative for data. In an implementation, deferring authoritative priority can mean ignoring the stale data source until it communicates a subsequent request to update the corresponding data. In an implementation, deferring authoritative priority can mean removing the priority for the attribute from stale data source.

Alternative implementations for defining the staleness period are also available. In an implementation, the staleness period can be defined using an absolute staleness reconciliation rule indicating a specific period of time, such as a number of days, during which a data source remains authoritative over data. For example, a reconciliation rule can provide that data source 1 has authority over CI type "Server" for ten days. If the ten-day period expires before a request to update data for a "Server" CI is received from data source 1, then another data source can become authoritative for the CI type "Server," or requests to update the data received from another data source with a lower priority for the data than data source 1 can be processed, for example, due to the higher priority of data source 1 being ignored. In an implementation, the staleness period can be defined using a relative staleness reconciliation rule indicating a period of time that a first data source remains authoritative over data as against a second data source. For example, if data source 1 does not communicate an update request within the ten-day period and data source 2 is indicated in the relative staleness reconciliation rule, then authoritative priority can switch from data source 1 to data source 2. In an implementation, the staleness period can be defined using a comparison-based staleness reconciliation rule, for example, comparing the reliability of a data source with respect to a CI as against the reliability of another data source to determine the authority time. For example, if the difference between a current time and the time of the last update from data source 1 is greater than product of the expiration of the staleness period for data source 1 and the difference between the priorities of data sources 1 and 2, then an update request received from data source 2 will be processed.

Figure 7:
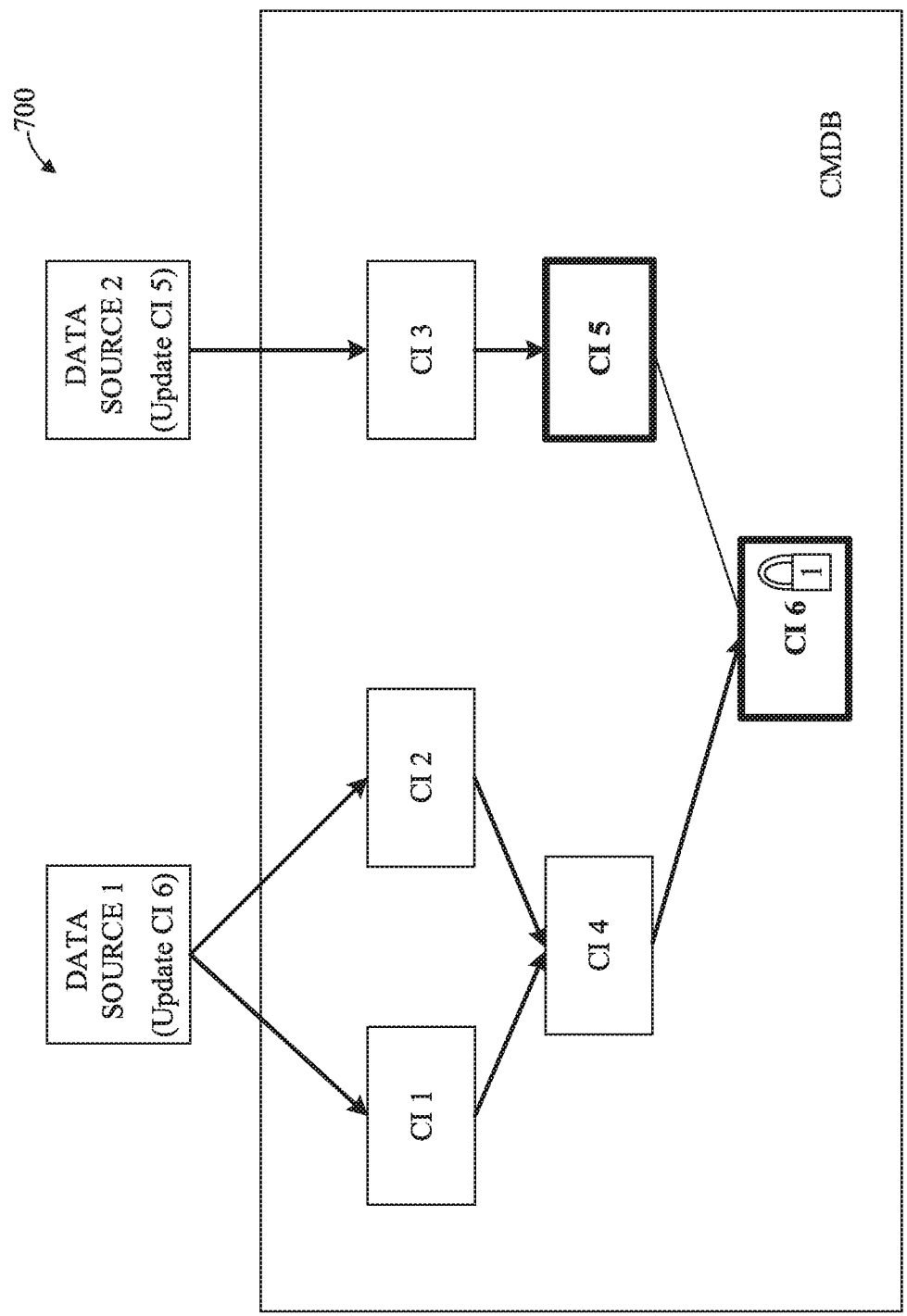
FIG. 7 is a diagram of concurrency control used in an implementation of network resource identification and reconciliation.

FIG. 7 is a diagram 700 of concurrency control used in an implementation of network resource identification and reconciliation. Concurrency control can refer to the ability to concurrently update portions the CMDB using multiple data sources that target different CIs for processing. In an implementation, optimistic locking can be used as the form of concurrency control, where certain CIs can be locked to prevent other updates affecting those CIs from occurring until after a current update is processed. Using concurrency control in this way permits updates to be made inline within the CMDB without the need for a separate staging area.

In an implementation for using optimistic locking, a graph of CIs and relationships between CIs is taken as input. The graph can comprise a representation of all or a portion of a CMDB (e.g., CMDB 425). In an implementation, for example, where the identification process occurs with respect to a cache (e.g., CMDB cache 510), the graph can comprise a representation of a set of CIs stored within the cache. For consistency, but without limiting the implementations available, further references to the graph in the discussion of FIG. 7 will refer to a CMDB. The CIs within the CMDB can be categorized as independent CIs or dependent CIs based on the relationships indicated in or by the CMDB (e.g., determined using identification rules). After the CIs have been categorized based on their dependencies (or lack thereof), an identification process, for example, for determining whether a CI to be updated (e.g., indicated within an update request received from a data source, such as a data source 405) already exists in the CMDB can be performed. In an implementation, after identifying the CI to be updated, the identification process can include pre-processing the update to determine how the CI (and other CIs in the CMDB, as applicable) will change as a result of the update. In an implementation, the pre-processing can include parsing the update request received from the data source to determine the properties of the CIs that will be changed in processing the update request.

In an implementation, after the CI is identified and the update is pre-processed, a concurrency control process can first determine whether all of the CIs categorized as independent CIs already exist within the CMDB. In the event that a CI for an independent CI is not present in the CMDB, the CI can be added as part of a pessimistic locking process. In an implementation, an independent CI not present in the CMDB can be added by multiple data sources acting in parallel, and so the pessimistic locking can place a global lock on all CIs of the CMDB to prevent any other changes from occurring until after the independent CI is added. The lock can be released upon the independent CI being added to the CMDB. In an implementation, the pessimistic locking process includes placing a global lock on all or a portion of the CMDB to avoid interleaved or intervening changes to CIs to be created or updated (e.g., as determined from the pre-processing).

In an implementation, once it is determined that all independent CIs exist in the CMDB, an optimistic locking process can lock independent CIs from which the CIs to be updated depend, for example, based on a system identifier for the CIs. In an implementation, one lock can be used for each record. In an implementation, a lock can be a bit or flag for indicating whether changes can be made to the record. In an implementation, a dependent CI to be updated can be protected by a lock on its parent CI, which eliminates the need for the dependent CI to be locked, as well.

In an implementation, certain changes to the CMDB that have been made since the identification process was completed can be detected. For example, when a counter for an independent CI has changed, it can be determined that another data source has made an intervening update, which can indicate that the data to be updated is no longer in the same state as when it was identified. In an implementation, the counter for an independent CI can be used to determine that an intervening change was made to the CMDB within a time interval proximate to the identification and the locking of one or more CIs used for the identification. For example, the time interval can include a starting time proximate to the identification of the CMDB and an ending time proximate to the locking of one or more independent CIs. For example, the counter can indicate a first state of the independent CI before, after, or at a time proximate to the identification of the CMDB and a second state of the independent CI before, after, or at a time proximate to the locking. In this way, changes made to the CMDB can be determined throughout the identification, pre-processing, and optimistic locking processes. In the event that an intervening change is detected, the lock can be released from the independent CI(s) without committing the update, and the identification process (and pre-processing, to the extent not included as part of the identification process) can be repeated to make sure that the data being updated is up to date. For example, the intervening change may have changed one or more relationships between CIs in the CMDB such that the graph input for optimistic locking may be rebuilt in a different way. However, if the recheck indicates that no changes have been made to the CMDB since the identification process was completed (e.g., because the first and current values for an independent CI are identical), then the update request received from the data source can be committed to the corresponding CI(s), for example, to update corresponding network resource attributes.

Diagram 700 depicts a graph of six CIs identified within a CMDB, where CI 6 represents an independent CI and CIs 1, 2, 3, 4, and 5 each represent dependent CIs. For example, independent CI 6 can represent a Linux server having a counter value of thirteen, dependent CIs 4 and 5 can represent different Tomcat web servers (e.g., as facilitating different micro services) hosted on the Linux server of CI 6, dependent CIs 1 and 2 can represent web application archive (WAR) files for different Java web applications executing on the Tomcat of CI 4, and dependent CI 3 can represent a WAR file for a Java web application executing on the Tomcat of CI 5. A concurrent update can be processed based on a first update request to update a property of Linux server CI 6, received from data source 1, and a second update request to update a property of Tomcat CI 5, received from data source 2. For example, the first update request can indicate a new operating system or operating system patch to be installed on the Linux server CI 6, and the second update can indicate a new port to be used by the Tomcat CI 5. The preprocessing for each update request can be done on the identified CIs 1 through 6 to determine that the first update request will change a property of CI 6 and the second update request will change a property of CI 5.

Because a single independent CI (Linux server CI 6) is to be used for processing both update requests, the first and second update requests cannot be processed in parallel. As such, the first update request can lock Linux server CI 6 to prevent concurrent updates for its dependent CIs (e.g., CI 5, which will be updated by the second update request) from being processed until after the first update request has been completed. After the lock is placed on Linux server CI 6, its counter can be rechecked to determine whether the same value read when the CI was identified is still reflected in the current counter for the CI within the CMDB. For example, if a third update request received from a different data source was processed after Linux server CI 6 was identified but before it was locked, the counter for Linux server CI 6 may reflect a different value than when the CI was identified. If the counter value read when Linux server CI 6 was identified matches the currently-reflected counter value, the first update request can be committed to Linux server CI 6, for example, to update the operating system of the Linux server. Once the first update request has been completed, the lock on CI 6 can be released so that the second update request can be processed.

Further implementations of the disclosure will now be described with reference to FIGS. 8 and 9. The steps, or operations, of any method, process, or algorithm described in connection with the embodiments disclosed herein may be embodied directly in hardware, firmware, software executed by hardware, circuitry, or a combination of these. Broadly, method 800 of FIG. 8 and method 900 of FIG. 9 are respectively used for identification and reconciliation of network resources in a cloud computing network, such as computing system 100 of FIG. 1. In an implementation, method 800 and/or method 900 may be executed using machines and hardware such as the equipment of FIGS. 1, 2, and 3. In an implementation, method 800 and/or method 900 may be performed, for example, by executing a machine-readable program of Javascript, C, or other such instructions. Implementations of the present disclosure may include multiple of the above-described features.

For ease of explanation, methods 800 and 900 are depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

FIG. 8 is a flowchart showing an implementation of a method 800 for the identification of network resources. Method 800 begins at operation 805, where data is received from a data source, the data relating to a resource of a computer network. In an implementation, the data source can be a data source that, for example, generates data or receives data in response to the performance of a discovery operation, which data source can be authoritative or have priority with respect to the resource. In an implementation, the resource can be associated with a CI of a CMDB, wherein an attribute of the resource can be associated with a property of the CI.

In an implementation, in response to receiving the data at operation 805, method 800 can continue to operation 810, where it can be determined whether a record of the resource is stored within a cache, for example, based on a dependency relationship associated with the record of the resource. In an implementation, operation 810 can comprise retrieving a list of CIs stored within a least-recently-used cache and determining, using containment and/or hosting metadata rules, whether a record for the CI associated with the data received at operation 805 is already included within the cache data. For example, the identification rules can be used to indicate a location within a CMDB that the CI would be stored based on one or more dependencies between the corresponding CI and parents or children of the CI within the CMDB.

In an implementation, in response to determining that the CI is not stored within the cache, the CI can be generated within the cache based on the dependency relationship data. For example, the dependency relationship data used in operation 810, which can derive from the CMDB in communication with the cache, can be used for generating the CI data, for example, to associate the corresponding CI with applicable parents and/or children within the CMDB. In an implementation, in the event that the CI is stored within the cache, the CI can be updated based on the data received at operation 805. In an implementation, updating the CI within the cache can include updating the corresponding CI within the CMDB.

FIG. 9 is a flowchart showing an implementation of a method 900 for the reconciliation of network resources. Method 900 begins at operation 905, where, similarly to operation 805 of method 800, data is received from a data source, the data relating to a resource of a computer network. In an implementation, the data source can be a data source that, for example, generates data or receives data in response to the performance of a discovery operation, which data source can be authoritative or have priority with respect to the resource. In an implementation, the data can be related to an attribute of the network resource.

In an implementation, in response to receiving the data at operation 905, method 900 can continue to operation 910, where it can be determined whether the data source from which the data was received at operation 905 is authoritative for the resource, for example, based on a priority of the data source with respect to the data and a time at which the data was received. For example, reconciliation rules can be used to determine whether or not the data source is authoritative for the resource by determining whether any other registered data source have higher priority than the data source. In the event that the data source is determined to be authoritative for the resource based on priority, it can be determined whether a staleness period for which the data source remains authoritative for the resource has elapsed since the last request to update the resource was received from the data source.

In an implementation, in response to determining that the data source from which the data was received is authoritative over the resource and that the staleness period for which the communication machine remains authoritative has not elapsed, the attribute of the resource within the computer network (e.g., the corresponding property of the CI within the CMDB) can be updated based on the data received at operation 905.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system, comprising:
    a processor; and
    a memory, wherein the memory stores instructions that, when executed by the processor, cause the processor to:
        receive data from a data source, the data relating to a resource of a computer network;
        identify a resource class of a plurality of resource classes to which the resource belongs;
        retrieve one or more identification rules associated with the resource class, wherein the one or more identification rules identify one or more attributes used to identify the resource within the resource class;
        identify the one or more attributes of the resource that identify the resource based at least in part on the retrieved identification rules and the data received from the data source;
        search a configuration management database (CMDB) cache for a cache record of a plurality of cache records having the one or more identified attributes;
        in response to the CMDB cache having the cache record having the one or more identified attributes, identify a corresponding record in a CMDB based on the cache record and update the corresponding record stored in the CMDB; and
        in response to the CMDB cache not having the cache record having the one or more identified attributes, update the CMDB cache to include the cache record having the one or more identified attributes, and update the CMDB based on the CMDB cache to include the corresponding record, wherein the data source does not communicate directly with the CMDB.

2. The system of claim 1, wherein updating the CMDB cache to include the cache record having the one or more identified attributes comprises evicting one or more cache records from the CMDB cache and adding the cache record having the one or more identified attributes.

3. The system of claim 2, wherein the one or more cache records are evicted from the CMDB cache based on a least recently used (LRU) policy comprising evicting cache records from the CMDB cache that have not been added or updated for a longest period of time.

4. The system of claim 1, wherein the cache record comprises data indicative of the corresponding record in the CMDB and of one or more relationships between the corresponding record and one or more other records.

5. The system of claim 4, wherein the one or more relationships between the corresponding record in the CMDB and the one or more other records comprise an indication of a parent record, a child record, or both, of the corresponding record.

6. The system of claim 1, wherein the CMDB cache is stored on the memory, wherein, in response to the CMDB cache not having the cache record having the one or more identified attributes, the CMDB cache is configured to refresh itself to include the cache record having the one or more identified attributes.

7. The system of claim 1, wherein the CMDB cache is stored on the memory, wherein the CMDB cache is configured to provide the cache record for retrieval by the processor to enable the processor to identify the corresponding record of the CMDB.

8. The system of claim 1, wherein the instructions cause the processor to determine that the data source is authoritative for the resource based on a priority of the data source relative to one or more other priorities of the one or more other data sources.

9. A method, comprising:
    receiving data from a data source, the data relating to a resource of a computer network;
    identifying a resource class of a plurality of resource classes to which the resource belongs;
    retrieving one or more identification rules associated with the resource class, wherein the one or more identification rules identify one or more attributes used to identify the resource within the resource class;
    identifying the one or more attributes of the resource that identify the resource based at least in part on the retrieved identification rules and the data received from the data source;
    searching a configuration management database (CMDB) cache for a cache record of a plurality of cache records having the one or more identified attributes;
    in response to the CMDB cache having the cache record having the one or more identified attributes, identifying a corresponding record in a CMDB based on the cache record and updating the corresponding record stored in the CMDB when the data source is authoritative for the resource as compared to one or more other data sources; and
    in response to the CMDB cache not having the cache record having the one or more identified attributes, updating the CMDB cache to include the cache record having the one or more identified attributes, and updating the CMDB based on the CMDB cache to include the corresponding record, wherein the data source does not communicate directly with the CMDB.

10. The method of claim 9, wherein updating the CMDB cache to include the cache record comprises refreshing the CMDB cache to include the cache record having the one or more identified attributes.

11. The method of claim 10, wherein refreshing the CMDB cache comprises evicting one or more cache records from the CMDB and adding the cache record having the one or more identified attributes.

12. The method of claim 11, wherein evicting the one or more cache records comprises removing one or more cache records from the CMDB cache that have not been used for a longest period of time.

13. The method of claim 9, comprising determining that the data source is authoritative for the resource based on a priority of the data source relative to one or more other priorities of the one or more other data sources.

14. The method of claim 9, comprising performing a discovery operation against a plurality of resources of the computer network, wherein the data is received from the data source based on the discovery operation.

15. The method of claim 14, wherein the discovery operation comprises a horizontal discovery routine, a contextual discovery routine, a process performed by or on a system outside the computing network, or a combination thereof.

16. A non-transitory, tangible, and computer-readable medium comprising instructions configured to cause one or more hardware processors to:
    receive data from a data source, the data relating to a resource of a computer network;
    identify a resource class of a plurality of resource classes to which the resource belongs;
    retrieve one or more identification rules associated with the resource class, wherein the one or more identification rules identify one or more attributes used to identify the resource within the resource class;
    identify the one or more attributes of the resource that identify the resource based at least in part on the retrieved identification rules and the data received from the data source;
    search a configuration management database (CMDB) cache for a cache record of a plurality of cache records having the one or more identified attributes; and
    in response to the CMDB cache not having the cache record having the one or more identified attributes, evict one or more cache records from the CMDB cache, add the cache record having the one or more identified attributes to the CMDB cache, and update a CMDB based on the CMDB cache to include a corresponding record, wherein the data source does not communicate directly with the CMDB.

17. The medium, as set forth in claim 16, wherein the instructions cause the processor to:
    in response to the CMDB cache having the cache record having the one or more identified attributes, identify the corresponding record in the CMDB based on the cache record and update the corresponding record stored in the CMDB when the data source is authoritative for the resource as compared to one or more other data sources.

18. The medium, as set forth in claim 16, wherein the one or more cache records are evicted from the CMDB cache based on a least recently used (LRU) policy comprising evicting cache records from the CMDB cache that have not been added or updated for a longest period of time.

19. The medium, as set forth in claim 16, wherein the cache record comprises data indicative of the corresponding record in the CMDB and of one or more relationships between the corresponding record and one or more other records.

20. The medium, as set forth in claim 16, comprising instructions configured to cause one or more hardware processors to determine that the data source is authoritative for the resource based on a priority of the data source relative to one or more other priorities of the one or more other data sources.

* * * * *